(12) United States Patent
Jia et al.

(10) Patent No.: US 11,906,318 B2
(45) Date of Patent: Feb. 20, 2024

(54) PERSONALIZED ROUTING BASED ON DRIVER FATIGUE MAP

(71) Applicant: Huawei Technologies Co., Ltd., Shenzhen (CN)

(72) Inventors: Chengcheng Jia, Plano, TX (US); Lei Yang, Plano, TX (US); Hai Yu, Plano, TX (US); Wei Huang, Plano, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 173 days.

(21) Appl. No.: 17/486,335

(22) Filed: Sep. 27, 2021

(65) Prior Publication Data

US 2022/0011132 A1    Jan. 13, 2022

Related U.S. Application Data

(63) Continuation of application No. PCT/US2019/024917, filed on Mar. 29, 2019.

(51) Int. Cl.
*G01C 21/34* (2006.01)
*G01C 21/36* (2006.01)
(Continued)

(52) U.S. Cl.
CPC ......... *G01C 21/3617* (2013.01); *B60Q 9/008* (2013.01); *B60W 40/04* (2013.01); *B60W 40/08* (2013.01); *B60W 50/14* (2013.01); *G01C 21/3484* (2013.01); *G06N 20/00* (2019.01); *B60W 2040/0818* (2013.01);
(Continued)

(58) Field of Classification Search
CPC ............ G01C 21/3617; G01C 21/3484; G06N 20/00; B60Q 9/008; B60W 40/04; B60W 40/08; B60W 50/14; B60W 2556/10; B60W 2556/40; B60W 2554/4046;
(Continued)

(56) References Cited

U.S. PATENT DOCUMENTS 9,927,252 B1    3/2018    Chokshi et al.
10,096,038 B2   10/2018   Ramirez et al.
(Continued)

FOREIGN PATENT DOCUMENTS

CN      1580706 A      2/2005
CN      103620344 A    3/2014
(Continued)

*Primary Examiner* — Truc M Do
(74) *Attorney, Agent, or Firm* — Conley Rose, P.C.

(57) ABSTRACT

The disclosure relates to technology for a navigation system that enhances the safety of drivers using fatigue detection mapping. The navigation system accesses data sources storing map data a route for drivers of one or more first vehicles. Based on the map data, a personalized fatigue map for a driver of a second vehicle is generated based on the map data. The personalized fatigue map displays predicted driver fatigue of the driver of the second vehicle on the route. Drivers in the first and second vehicles are monitored to detect driver fatigue and a level of the driver fatigue is measured according to a calculated fatigue score. When driver fatigue is detected, a recommendation is output to the driver of the second vehicle that is based on the level of the driver fatigue. The personalized fatigue map is updated to reflect the recommendation.

24 Claims, 12 Drawing Sheets

(51) Int. Cl.
  *G06N 20/00* (2019.01)
  *B60Q 9/00* (2006.01)
  *B60W 40/04* (2006.01)
  *B60W 40/08* (2012.01)
  *B60W 50/14* (2020.01)
(52) U.S. Cl.
  CPC ... *B60W 2050/146* (2013.01); *B60W 2540/22* (2013.01); *B60W 2554/4046* (2020.02); *B60W 2556/10* (2020.02); *B60W 2556/40* (2020.02)
(58) Field of Classification Search
  CPC ... B60W 2040/0818; B60W 2050/146; B60W 2540/22
  See application file for complete search history.

(56) References Cited

U.S. PATENT DOCUMENTS

| | | | |
|---|---|---|---|
| 2005/0055157 A1 | 3/2005 | Scholl | |
| 2007/0296601 A1* | 12/2007 | Sultan | A61B 5/082 340/576 |
| 2012/0133514 A1 | 5/2012 | Palshof | |
| 2012/0133515 A1 | 5/2012 | Mikael | |
| 2015/0285653 A1* | 10/2015 | Kim | A61B 5/0205 701/423 |
| 2016/0001781 A1* | 1/2016 | Fung | G07C 9/37 701/36 |
| 2016/0090097 A1* | 3/2016 | Grube | B60W 40/08 340/576 |
| 2017/0154394 A1* | 6/2017 | Kan | G06Q 10/0635 |
| 2017/0242433 A1 | 8/2017 | Yuichi | |
| 2017/0355377 A1* | 12/2017 | Vijaya Kumar | B60W 50/0098 |

FOREIGN PATENT DOCUMENTS

| | | |
|---|---|---|
| CN | 104973054 A | 10/2015 |
| CN | 108238053 A | 7/2018 |
| CN | 108423006 A | 8/2018 |
| DE | 102005031312 A1 | 1/2007 |
| DE | 102007030526 A1 | 1/2009 |
| JP | 2005190082 A | 7/2005 |
| JP | 2009293996 A | 12/2009 |
| JP | 2013069152 A | 4/2013 |
| JP | 2014206785 A | 10/2014 |
| WO | 2014167811 A1 | 10/2014 |
| WO | 2016093751 A1 | 6/2016 |

* cited by examiner

PERSONALIZED ROUTING BASED ON DRIVER FATIGUE MAP

CROSS-REFERENCE TO RELATED APPLICATIONS

This application is a continuation of International Application No. PCT/US2019/024917 filed on Mar. 29, 2019, by Huawei Technologies Co., Ltd., and titled "Personalized Routing Based on Driver Fatigue Map," which is hereby incorporated by reference in its entirety.

TECHNICAL FIELD

The disclosure generally relates to driver behavior detection, and in particular, to a driver behavior system that enhances the safety of drivers using navigational maps and fatigue detection.

BACKGROUND

Vehicles have increasingly become technology dependent. With features such as navigations systems, driver fatigue recognition and autonomous vehicle driving, drivers are able to rely more heavily on their vehicles to provide safety than ever before. Traditional navigation systems assist drivers of vehicles by providing trip routes on a map, as well as identifying points of interest, travel distance and time. As part of identifying and selecting routes on the map, the navigation systems often consider traffic and accident reports within the geographical region being traveled by the vehicle to reduce travel distance and time. Other vehicle systems, such as driver assistance systems, have placed an increased importance on safety. These systems help to prevent accidents related to driver fatigue and drowsiness using mechanisms such as driver fatigue recognition. Additionally, autonomous vehicle driving has demonstrated the capability to greatly assist drivers on the road, particularly to avoid accidents and generally increase driver safety. While these, and many other, technologies have proved invaluable to drivers, there remains a demand for increased vehicle safety.

SUMMARY

According to one aspect of the present disclosure, there is provided a computer-implemented method, comprising accessing one or more data sources storing map data including historical fatigue data and current fatigue data for one or more segments of a route for drivers of one or more first vehicles; generating a personalized fatigue map for a driver of a second vehicle based on the map data obtained by accessing the one or more data sources, where the personalized fatigue map displays predicted driver fatigue of the driver of the second vehicle for the one or more segments on the route; monitoring the drivers of the one or more first vehicles and the second vehicles to detect driver fatigue based on readings captured by one or more sensors, where a level of the driver fatigue is measured according to a fatigue score; and outputting a recommendation, upon detection of the driver fatigue, to the driver of the second vehicle that is based on the level of the driver fatigue and updating the personalized fatigue map to reflect the recommendation.

Optionally, in any of the preceding aspects, the map data further includes online map data acquired from an online mapping data source; the historical fatigue data is collected for the drivers of the one or more first vehicles during a specified period in the past, and the historical fatigue data is used to generate a historical fatigue map that indicates the driver fatigue in each of the one or more first vehicles along the one or more segments of the route; and the current fatigue data is collected for the drivers of the one or more first vehicles in real-time, and the current fatigue data is used to generate a current fatigue map that indicates the driver fatigue in each of the one or more first vehicles along the one or more segments of the route.

Optionally, in any of the preceding aspects, generating the personalized fatigue map comprises applying the online map, the historical fatigue map and the current fatigue map to a learning algorithm to generate the personalized fatigue map.

Optionally, in any of the preceding aspects, the method further comprises calculating the fatigue score for the driver in the one or more first vehicles based on a set of parameters and an objective function; and when the driver in the one or more first vehicles is a neighboring driver of the driver in the second vehicle and poses a safety risk to the driver of the second vehicle based on the detected driver fatigue of the driver of the one or more first vehicles, alerting the driver of the second vehicle to avoid the neighboring driver determined to pose a safety risk as the recommendation.

Optionally, in any of the preceding aspects, the method further comprises updating the historical fatigue map and the current fatigue map to reflect the level of fatigue of the driver in the one or more first vehicles; and updating the personalized fatigue map to alter the route of the second vehicle to avoid the neighboring driver determined to pose a safety risk.

Optionally, in any of the preceding aspects, the method further comprises calculating the fatigue score for the driver in the second vehicle based on a set of parameters and an objective function when the driver in the second vehicle is detected to have driver fatigue; and alerting the driver of the second vehicle based on the historical fatigue data and current fatigue data for the drivers of the one or more first vehicles and the calculated fatigue score of the driver of the second vehicle.

Optionally, in any of the preceding aspects, the method further comprises updating the personalized fatigue map to alter the route of the second vehicle based on the calculated fatigue score for the driver of the second vehicle; and updating the historical fatigue map and the current fatigue map to reflect the level of fatigue of the driver in the one or more first vehicles.

Optionally, in any of the preceding aspects, the set of parameters includes one or more of a time duration, number of users, road scenario, fatigue time, fatigue duration, climate and driver long term driving patterns.

Optionally, in any of the preceding aspects, the altering comprises providing a warning to the driver of the second vehicle when the level of driver fatigue is calculated to be a first level; providing a warning and an alternative route to the driver of the second vehicle to a nearby location for rest when the level of driver fatigue is calculated to be a second level; and providing a warning to the driver of the second vehicle and enter the second vehicle into autonomous driving mode when the level of driver fatigue is calculated to be a third level.

According to still one other aspect of the present disclosure, there is a device, comprising a non-transitory memory storage comprising instructions; and one or more processors in communication with the memory, wherein the one or more processors execute the instructions to access one or more data sources storing map data including historical fatigue data and current fatigue data for one or more segments of a route for drivers of one or more first vehicles; generate a personalized fatigue map for a driver of a second vehicle based on the map data obtained by accessing the one or more data sources, where the personalized fatigue map displays predicted driver fatigue of the driver of the second vehicle for the one or more segments on the route; monitor the drivers of the one or more first vehicles and the second vehicles to detect driver fatigue based on readings captured by one or more sensors, where a level of the driver fatigue is measured according to a fatigue score; and output a recommendation, upon detection of the driver fatigue, to the driver of the second vehicle that is based on the level of the driver fatigue and update the personalized fatigue map to reflect the recommendation.

According to still one other aspect of the present disclosure, there is a non-transitory computer-readable medium storing computer instructions, that when executed by one or more processors, cause the one or more processors to perform the steps of accessing one or more data sources storing map data including historical fatigue data and current fatigue data for one or more segments of a route for drivers of one or more first vehicles; generating a personalized fatigue map for a driver of a second vehicle based on the map data obtained by accessing the one or more data sources, where the personalized fatigue map displays predicted driver fatigue of the driver of the second vehicle for the one or more segments on the route; monitoring the drivers of the one or more first vehicles and the second vehicles to detect driver fatigue based on readings captured by one or more sensors, where a level of the driver fatigue is measured according to a fatigue score; and outputting a recommendation, upon detection of the driver fatigue, to the driver of the second vehicle that is based on the level of the driver fatigue and updating the personalized fatigue map to reflect the recommendation.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
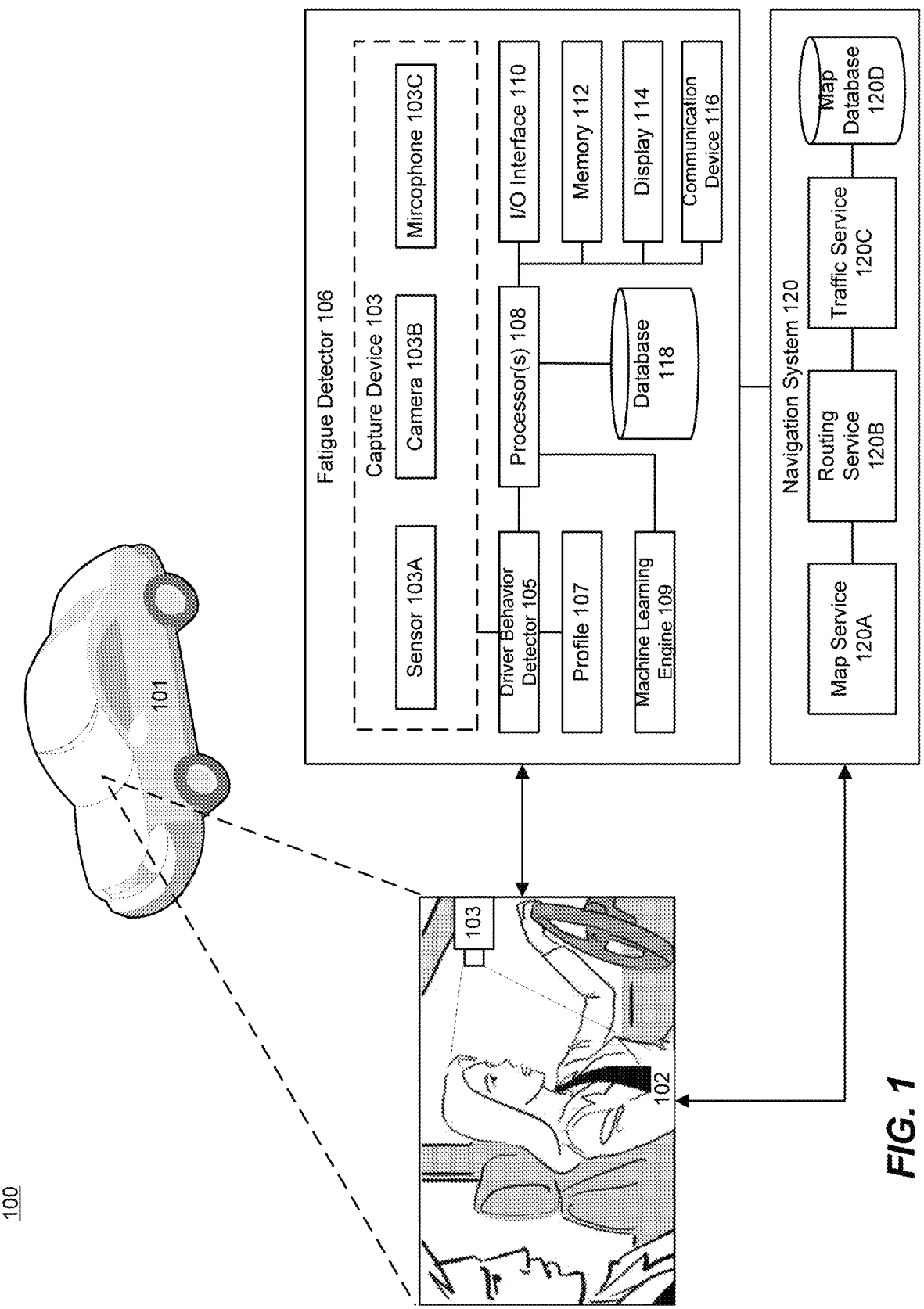
FIG. 1. illustrates an example navigation and driver fatigue recognition system for vehicles.

The present disclosure will now be described with reference to the figures, which in general relate to a driver behavior detection.

Driver behavior, including fatigue-related behavior, while driving can lead to unsafe driving and an increased likelihood of accidents. The disclosed embodiments provide a mechanism to capture driver behaviors, using both audio and/or visual techniques, to identify various types of driver behaviors, such as fatigue-related behaviors. In one embodiment, the driver behaviors are captured and collected for a number of drivers (e.g., a pool of drivers) over a predefined period in order to create a historical map that includes fatigue driver information. In another embodiment, the driver behaviors are captured and collected for a number of drivers in real-time in order to create a moment map that includes fatigue driver information. The historical map and the moment map, along with the detection of driver behavior for a current driver of a vehicle, may be used to generate a personalized map that includes the current driver fatigue information. The personalized map (i.e., personalized fatigue map) may be employed to generate various alerts and actions to the current driver in order to prevent unsafe driving, such as falling asleep at the wheel, as well as to alert or warn the current driver of unsafe driving from drivers neighboring vehicles.

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Automobile and mobile device navigation systems are increasingly being used by drivers to assist in finding routes to destinations. When a destination is set by the driver, these systems are capable of directing a driver with turn-by-turn instructions in real-time during the course of driving. Alternative and optimal routes may also be identified with the use of route planning software that makes use of a variety of features. The driver may use a navigation system to plan routes while monitoring or keeping apprised of current traffic conditions, weather conditions, or other factors that may adversely affect traveling. These systems may also be used in combination with other applications, software or systems to further aid drivers. One area of interest is the personalization of routing a vehicle based on the particular needs of a driver. For example, a driver that shows initial signs of fatigue may require a warning to get rest, whereas a driver that shows full signs of fatigue may require a recommendation to the nearest rest stop.

FIG. 1 illustrates an example navigation and driver behavior recognition system 100 for vehicles. The system 100 provides personalized routing and navigation information based on a wide variety of factors, including but not limited to, historical, current (or moment) and personal driver fatigue on routes being traversed by a vehicle. The driver fatigue information, in combination with the navigation system and mapping (or route) information, provides a robust platform in which to map routes and increase driver awareness and safety, particularly where driver fatigue is or becomes a factor.

In the illustrated embodiment, the system 100 includes a vehicle 101, fatigue detector 106 and a navigation system 120. The vehicle 101 shows a cab that includes a driver 102 (and passenger) along with a fatigue detector 106 and navigation system 120 that are communicatively coupled to the vehicle 101. In one embodiment, the fatigue detector 106 and/or navigation system 120 (or any one or more parts thereof) may be located in the vehicle 101. In another embodiment, the fatigue detector 106 and/or navigation system 120 (or any one or more parts thereof) may be located remote from the vehicle 101 and in communication via one or more networks (not shown). In one further embodiment, a capture device 103 is in a location capable of capturing information related to driver fatigue of a driver 102 of the vehicle 101.

The one or more networks may be a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

In the illustrated embodiment, the fatigue detector 106 includes a capture device 103, a driver behavior detector 105, an associated profile 107, one or more processors 108, a machine learning engine 109, an input/output (I/O) interface 110, a memory 112, a display 114, a communication device 116, and a database 118.

The capture device 103 may be responsible for monitoring and identifying driver behaviors based on captured driver motion and/or audio data using one or more capturing devices positioned within the cab, such as sensor 103A, camera 103B or microphone 103C. In one embodiment, the capture device 103 is positioned to capture motion of the driver's head and face, while in other implementations movement of the driver's torso, and/or driver's limbs and hands are also captured. For example, the driver behavior detector 105 can monitor driver behavior captured by capture device 103 to detect specific poses, such as whether a person is holding a steering wheel of a vehicle with both of their hands while driving a vehicle, or whether the person has one of their arms raised with their hand in a first while driving a vehicle.

Still other embodiments include capturing audio data, via microphone 103C, along with or separate from the driver movement data. The captured audio may be, for example, an audio signal of the driver 102 captured by microphone 103 C. The audio can be analyzed to detect various features that may vary in dependence on the state of the driver. Examples of such audio features include slurred speech or snoring, which may be indicative of a fatigued or drowsy state of the driver.

Although the capture device 103 is depicted as a single device with multiple components, it is appreciated that each component (e.g., sensor, camera, microphone, etc.) may be a separate component located in different areas of the vehicle 101. For example, the sensor 103A, the camera 103B and the microphone 103C may each be located in a different area of the vehicle's cab. In another example, individual components of the capture deice 103 may be part of another component or device. For example, camera 103B and display 114 may be part of a mobile phone or tablet (not shown) placed in the vehicle's cab, whereas sensor 103A and microphone 103C may be individually located in a different place in the vehicle's cab.

Driver behavior detector 105 may be associated with a profile 107, which models driver behavior and is explained further below, and together may detect one or more attributes that are indicative of the manner in which a driver 102 of the vehicle 101 behaves. Driver behaviors may include, for example, the driver's normal blink rate, gaze direction, limb and/or torso position and/or other driver movement and activity or driver sound or audio. When a driver's 102 behavior deviates substantially from a profile 107, it may be an indication of erratic or unusual driver behavior that implies the safety of the vehicle, and its occupants, are at an increased risk. For example, a fast blink rate or awkward gaze direction may demonstrate that the driver is fatigued. In another example, snoring or slurred speech may be indicative of a driver about to fall or having fallen asleep at the wheel. As explained further below, assessing driver behavior in real-time in conjunction with historical and current mapping data or information, enables the system 100 to provide real-time feedback (e.g., an alert, message, re-route, etc.) in response to detecting unwanted driver behavior.

In one embodiment, the driver's behavior may be compared to a personal profile or a pooled group of driver profiles or to a "threshold" profile each of which may act as a baseline for the comparison. The comparison may be used to determine whether a particular driver's actions (e.g., facial expression, motion or sound) constitutes acceptable (e.g., fatigue not or likely not an issue) or unacceptable (e.g., fatigue likely or is an issue) driver behavior. For example, an algorithm may be employed to determine whether the eye closures of a driver 102 captured by the capture device 103 are more likely associated with acceptable (e.g., eyes are open and blinking at a specified threshold of behavior) or unacceptable (e.g., eyes remain closed for longer than threshold level of behavior) driver behavior.

While driver motion and/or audio may be captured for analysis to identify driver behaviors, additional information may also be captured and collected. Additional information may include, but is not limited to, driver history, mapping and routing information. The identified behaviors may be used to generate an initial or baseline driver profile as well as to generate historical profiles in which data is collected over a predetermined period of time. In one embodiment, additional information includes the context or environment within which the driver is currently driving the vehicle 101. For example, context or environment as it applies to driving a vehicle may be defined as a set of current conditions in which the driver is operating. Such conditions may include the length of time that the driver has been on the road (e.g., current hours of driving), length of time since the driver last slept, weather conditions, temperature, heading direction, position of the sun, road conditions, date and time of day/night, traffic conditions, and/or any other current conditions that relate to and/or can influence driver behavior, including a historical collection of any of the afore-mentioned conditions. This information may be collected for individual drivers and/or for any number of drivers (e.g., a crowd source or pool of drivers) for a geographic region or route over a predetermined period of time. Accordingly, the fatigue of other drivers on the road may also be captured and collected as part of the overall fatigue detection and analysis.

In some embodiments, the detected driver behaviors are behaviors related to fatigue or drowsiness or falling asleep. These driver behaviors can be indicated by movements such as excessive yawning, blinking, and/or head nodding. In some embodiments, the driver behaviors are active behaviors (in contrast to fatigue-related behaviors), such as texting, emailing, using a cell phone or tablet, eating, reading, talking, etc. For example, movements/positions consistent with driver interaction with a device may be demonstrated by the driver gaze directions, eye and/or retina movements, e.g., back and forth from road to device, finger/hand movements consistent with touch or keypad interaction, head rotations, e.g., alternately toward road and toward a device, etc.

In one embodiment, the driver behavior detector 105 may comprise hardware running software and/or firmware configured to implement driver behavior detection. In some embodiments, the driver behavior detector 105 may be implemented as part of an onboard computer of a vehicle (not shown) or processor(s) 108. In other embodiments, the captured driver motion and related audio data and optionally at least some of the additional information is transmitted from the vehicle to an external computer or processor via a network (not shown). In some embodiments, some portions of driver behavior detection, such as motion detection, image processing, and/or behavior recognition, classification, and detection, may be implemented by the fatigue detector 106 in the vehicle 101, whereas other portions of the driver behavior detector such as analysis of the processed data may be implemented by an external processor via a network.

Input/output interface(s) 110 allow information to be presented to the user and/or other components or devices using various input/output devices. Examples of input devices include a keyboard, a microphone, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device 114, speakers, and so forth. In one embodiment, I/O interface 110 receives the driver motion data and/or audio data of the driver 102 from the capturing device 103. The driver motion data may be related to, for example, the eyes and face of the driver 102, which may be analyzed by processor 108.

In one example embodiment, extracting and measurement of eye closures is determined by the processor 108. For example, the processor 108 can determine an eye closure ratio of the driver 102 in a current time period using the one or more eye closure measurements and a profile 107 of the driver 102. In this example, the eye closure ratio indicates a ratio of eye closure of the driver 102 as measured in the current time period with eye closure of the driver 102 retrieved from the profile 107 of the driver 102 during a baseline state (e.g., a state where the driver's eyes are closed or opened). The eye closure ratio may then be normalized and a percentage eye closure value may be determined by the processor 108, and the process may be reiterated over a period of time. The measurements may then be compared to stored values, for example, in the profile 107 of the driver 102 to determine whether the measured eye closures is indicative of a fatigued or drowsy state of the driver 102 of the vehicle 101. In one embodiment, the processor 108 continues to take measurements until the vehicle is turned off or the driver 102 otherwise completes driving, for example by exiting the vehicle 101.

Data collected by the fatigue detector may be stored in database 118, in memory 112 or any combination thereof. In one embodiment, the data collected is from one or more sources external to the vehicle 101. The stored information may be data related to driver behavior and safety, such as information captured by capture device 103. In one embodiment, the data stored in database 118 may be a collection of data collected for vehicle 101 and/or other vehicles. In one example, the collected data may provide current data that is collected in real-time and may include current profile data and other data relevant and useful for driver behavior and safety. In one other embodiment, the collected data may provide historical data or information such as driving history, driver fatigue data, historical profile data and other data relevant and useful for driver behavior and safety that is collected in the past and/or over a period of time. The driving history may be included as part of the stored profile 107 in one embodiment. In another embodiment, the collected data may be current data of one or more drivers currently driving on a particular route or in a geographical region that provides a real-time indication of collected data.

Driver history may include historical data about the driver 102 and/or drivers of other vehicles. For example, a driver's history may include years of experience, type of experience, history of traffic accidents, items from an employment personnel record, history of speeding and/or other traffic violations, number, severity, and length of previously identified occurrences of various driver behaviors. As noted above, the system may collect and store a driving profile (e.g., profile 107) for a particular driver or drivers as part of a driver's history. For example, the driver's profile may include how quickly the driver accelerates or decelerates, usual speeds for particular driving conditions, e.g., night driving, driving in rain or snow, etc., how often the driver swerves or crosses the center line, and the like. The driver history information in one embodiment may be retrieved from an external database, such as a database of the driver's insurance company.

The driving history may also include information regarding one or more driving routes in which the driver of vehicle 101 or drivers of other vehicles have become fatigued while traversing. In some embodiments, the information regarding the one or more driving routes may also include road profiles, road topologies, the number of stops associated with a driving route, the number of turns associated with a driving route, etc.

In one embodiment, memory 112 can store instructions executable by the processor(s) 108, a machine learning engine 109, and programs or applications (not shown) that are loadable and executable by processor(s) 108. In one embodiment, machine learning engine 109 comprises executable code stored in memory 112 that is executable by processor(s) 108 and selects one or more machine learning models, such as behavior models, stored in memory 112 (or database 118). The behavior models may be developed based on acceptable and unacceptable driver behaviors (e.g., driver body positions), as well as using the current and historical data collected from the vehicle 101 and/or other vehicles, along with any other information related to driver behavior or history. A model of acceptable and unacceptable driver behaviors, such as driver body positions, can be developed using well known and conventional machine learning and deep learning techniques, such as implementation of a convolutional neural network (CNN), described in more detail below.

In one embodiment, the vehicle 101 and fatigue detector 106 interface directly with navigation system 120, which may display information on display 114 (as well as provide sound). For example, in one embodiment, the navigation system 120 may provide turn-by-turn navigation, routing information, re-routing information, maps, driving instructions, etc.

In one embodiment, the navigation system 120 includes a map service 120A, a routing service 120B, a traffic service 120C and a map database 120D, which together collect and provide navigational information. The map service 120A provides mapping data and related information such as points of interest (POI), including but not limited to gas stations, hospitals, coffee shops, rest stops, etc. The routing service 120B provides a routing engine for calculating navigation routes. The traffic service 120C provides traffic updates and conditions along a route.

The navigational information may be stored in a map database 120D. In one embodiment, the map database 120D stores map data that includes at least one of historical data, current data and online map data. In one other embodiment, the database 118 and map database 120D may be a single database. The map database 120D may include information in addition to that provided by other components in the navigation system 120. For example, lane records may be stored to provide lane information for road or travel segments along a route. In one embodiment, the lane information can include a number of lanes, dimensions of the lanes, direction of travel of the lanes, and/or any other lane attributes or characteristics. In one other example, additional information may include speed limit records that include information related to speed limits for road or travel segments. In one embodiment, speed limit information may include the actual speed limit as well as conditions or criteria for when the limits are applicable. For example, different speed limits can be specified based on time of day, type of vehicle, weather conditions, etc.

In one embodiment, the map database 120D can store information related to the POIs and their respective locations. In another embodiment, the map database 120D includes data about places, such as cities, towns, or other communities, and other geographic features, such as bodies of water, mountain ranges, etc.

In general, navigational information includes, but is not limited to, information related to routes, public spaces (parks, libraries, etc.), geographic areas (towns, boroughs, city blocks, etc.), POIs (restaurants, shopping, etc.), and other like navigational information. Such information may be gathered as navigational information or to supplement preexisting information, and may further include crowd source data, network information, public databases, public information (public transport schedules, etc.), and other similar information. In one embodiment, navigational information also may include a number of forms including annotations related to route information, location, logos, visual images, add acronyms, and other like forms that may indicate navigational information.

Figure 2A:
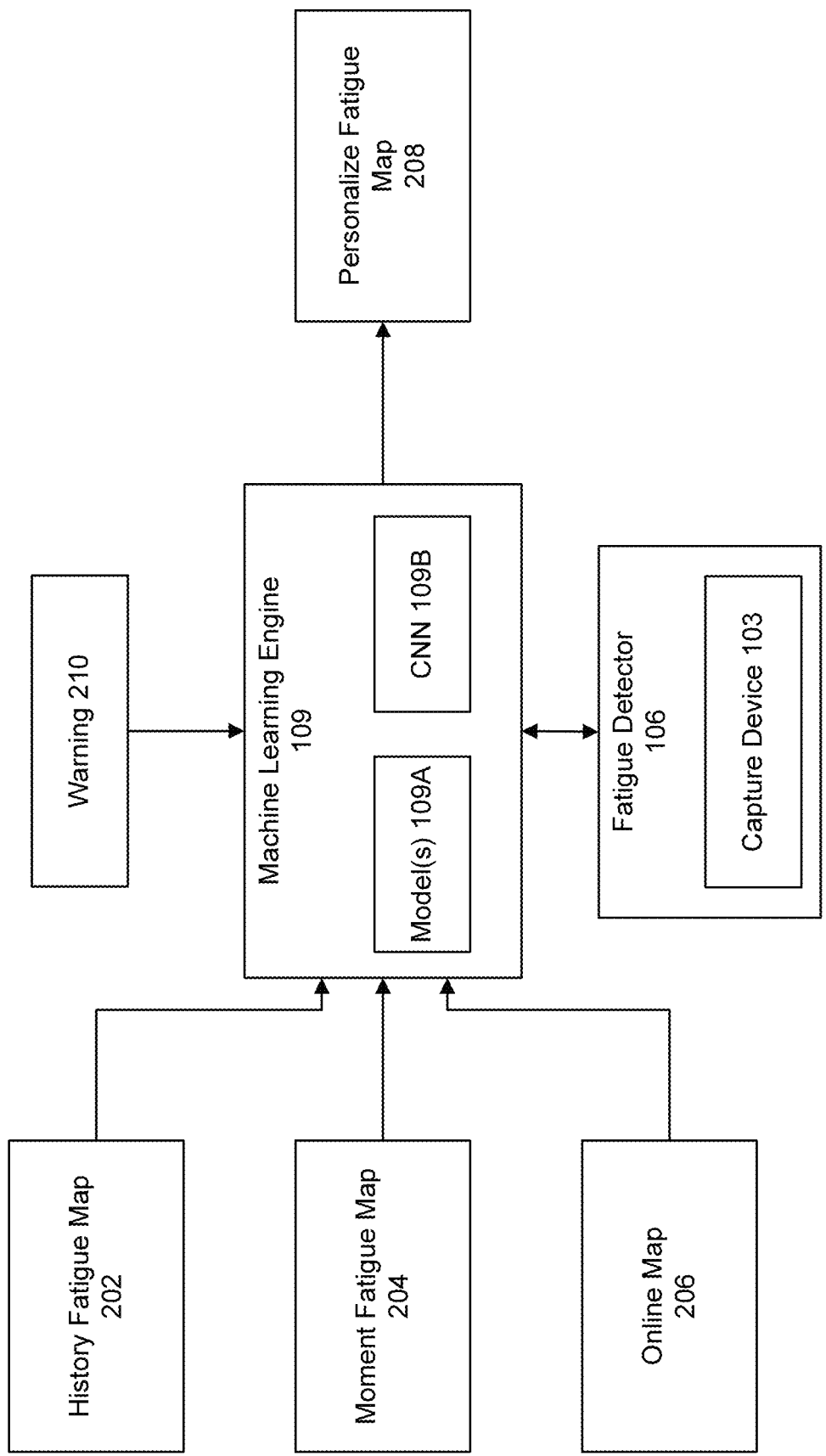
FIG. 2A illustrates an example embodiment in which a machine learning engine generates a personalized fatigue map.

FIG. 2A illustrates an example embodiment in which a machine learning engine generates a personalized fatigue map. The machine learning engine 109 predicts driver fatigue based on at least one of three inputs—history fatigue map (HFMap) 202, moment (or current) fatigue map (MFMap) 204 and online map 206. Online maps may be generated using applications such as Google® Maps, Apple® Maps, etc. In one embodiment, information collected by fatigue detector 106, including images and/or sounds captured by the capture device 103, may also be input into the machine learning engine 109. Based on the acquired information from the various maps 202, 204, 206 and fatigue detector 106 (including capture device 103), the machine learning engine 109 predicts driver fatigue (e.g., fatigue of driver 102 in vehicle 101) and generates a personalized fatigue map (PFMap) 208 which may be displayed to the driver 102, for example on display 114. In one embodiment, the PFMap 208 is displayed on a mobile device of the driver 102. In still another embodiment, the PFMap 208 may provide a warning (or alert) 210 to driver 102, either visually, audibly or a combination thereof. For example, the system 100 may warn or announce to the driver to "detour immediately" while simultaneously displaying a visual detour arrow instructing the driver to exit from the current route. In one other embodiment, the system 100 may notify or warn the driver 102 of other fatigued drivers that are within a specified distance and identified as fatigued. For example, in response to identifying a fatigued driver in a vehicle of an adjacent lane along the same route, the system 100 may announce to the driver "proceed immediately to the right lane" while simultaneously displaying a visual arrow to move to the right lane.

Figure 2B:
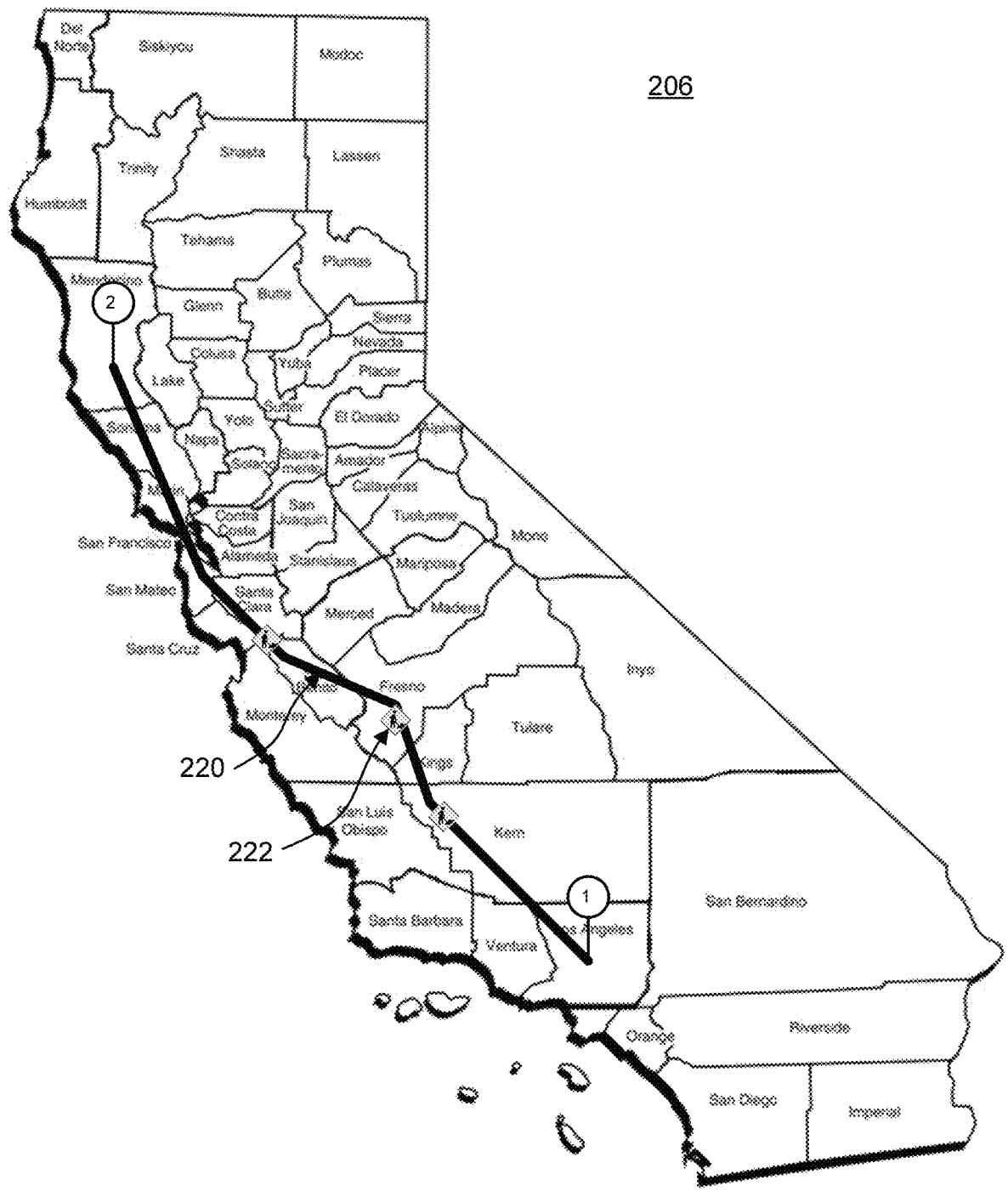
FIG. 2B illustrates an example online map

An example embodiment of the online map 206 may be found with reference to FIG. 2B. The online map 206 may show streets and highways, as well as geographical features, such as a river, and other large landmarks, such as restaurants, shops, rest stops, an airport, golf courses, universities, etc. Typically, such a map might also include the names of the regions shown on the map, such as residential communities, industrial parks, and the like. In particular, the online map 206 in the example illustration shows the state of California with a route 220 that begins in Los Angeles (drop pin 1) and ends in Mendocino (drop pin 2), with several labels or icons 222 indicative of construction along the route 220. In one embodiment, the online map 206 is generated by navigation system 120.

Figure 2C:
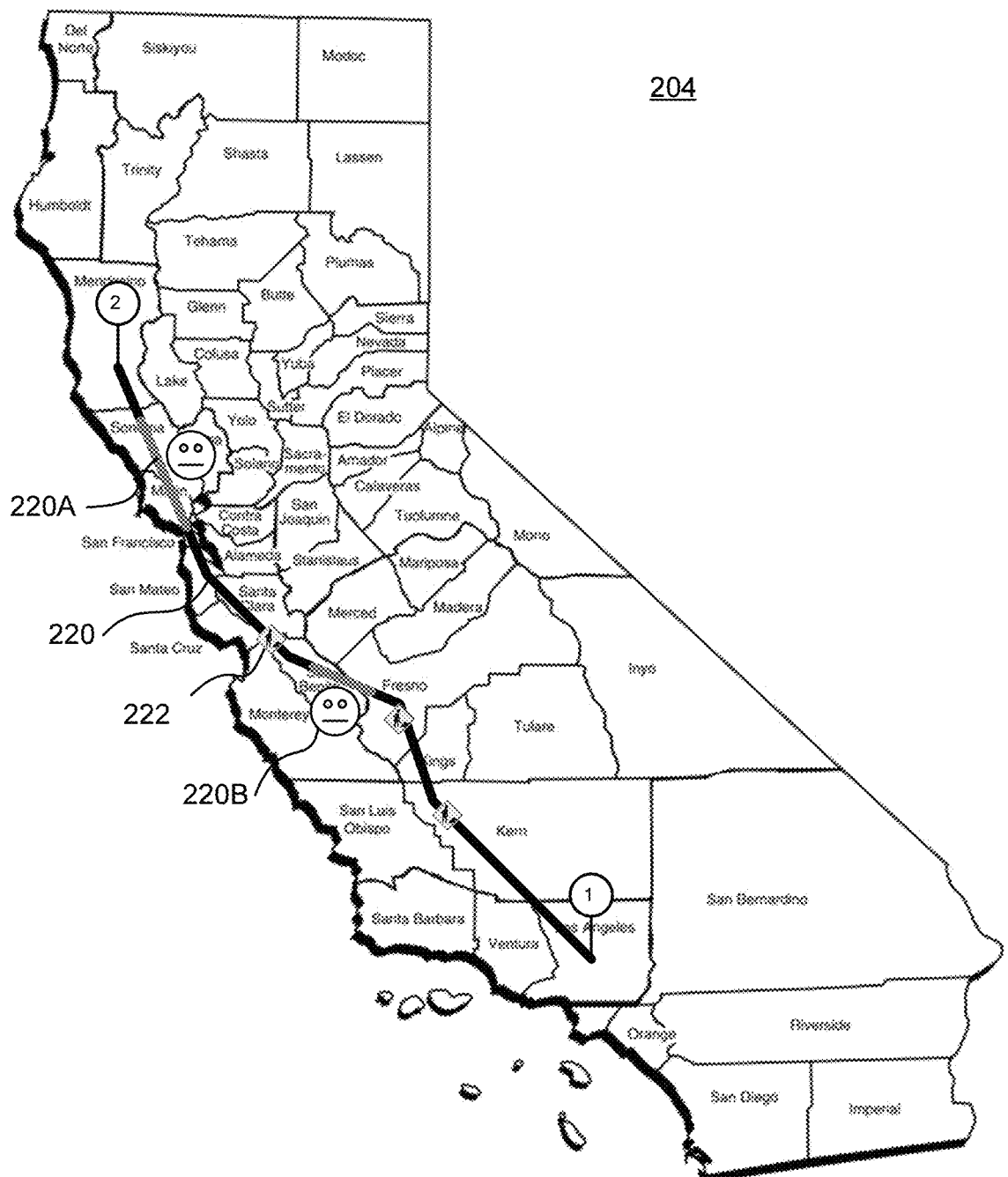
FIG. 2C illustrates an example map including historical driver behavior information.

An example embodiment of the MFMap 204 may be found with reference to FIG. 2C. In one embodiment, the online map 206 may serve as a base layer of the MFMap 204. Thus, the MFMap 204 may display the same or similar features to those described in the online map 206. For example, the route 220 that begins in Los Angeles (drop pin 1) and ends in Mendocino (drop pin 2) with icons 222 are displayed. In one embodiment, the MFMap 204 includes additional layers, such as a driver behavior layer, which may provide the capability to display driver behaviors on the MFMap 204. For example, the driver behavior layer may additionally display areas or segments 220A (also identifiable as gray segments along the route) along route 220 that identifies driver fatigue, such as one or more fatigued drivers 220B (also identifiable as one or more face icons along the route).

The driver behavior layer may serve to display detected driver behavior at any moment along a route 220. In one embodiment, factors to detect driver behavior (e.g., driver fatigue) may include traffic, personalized driving record (e.g., driving habits, amount of sleep, etc.), road scenario (e.g., straightaway, weather, time of day, etc.), and the like. In one embodiment, the MFMap 204 displays the current status of driver behaviors along route 220 at a particular moment or instance. For example, the MFMap 204 may display current driver behavior (e.g., driver fatigue) at 10:00 am on Oct. 17, 2019. Current driver behavior in this context can mean a moment in past (e.g., historical driver fatigue), a moment in real-time (e.g. current driver fatigue) or a predicted future moment (e.g., predicted driver fatigue).

Figure 2D:
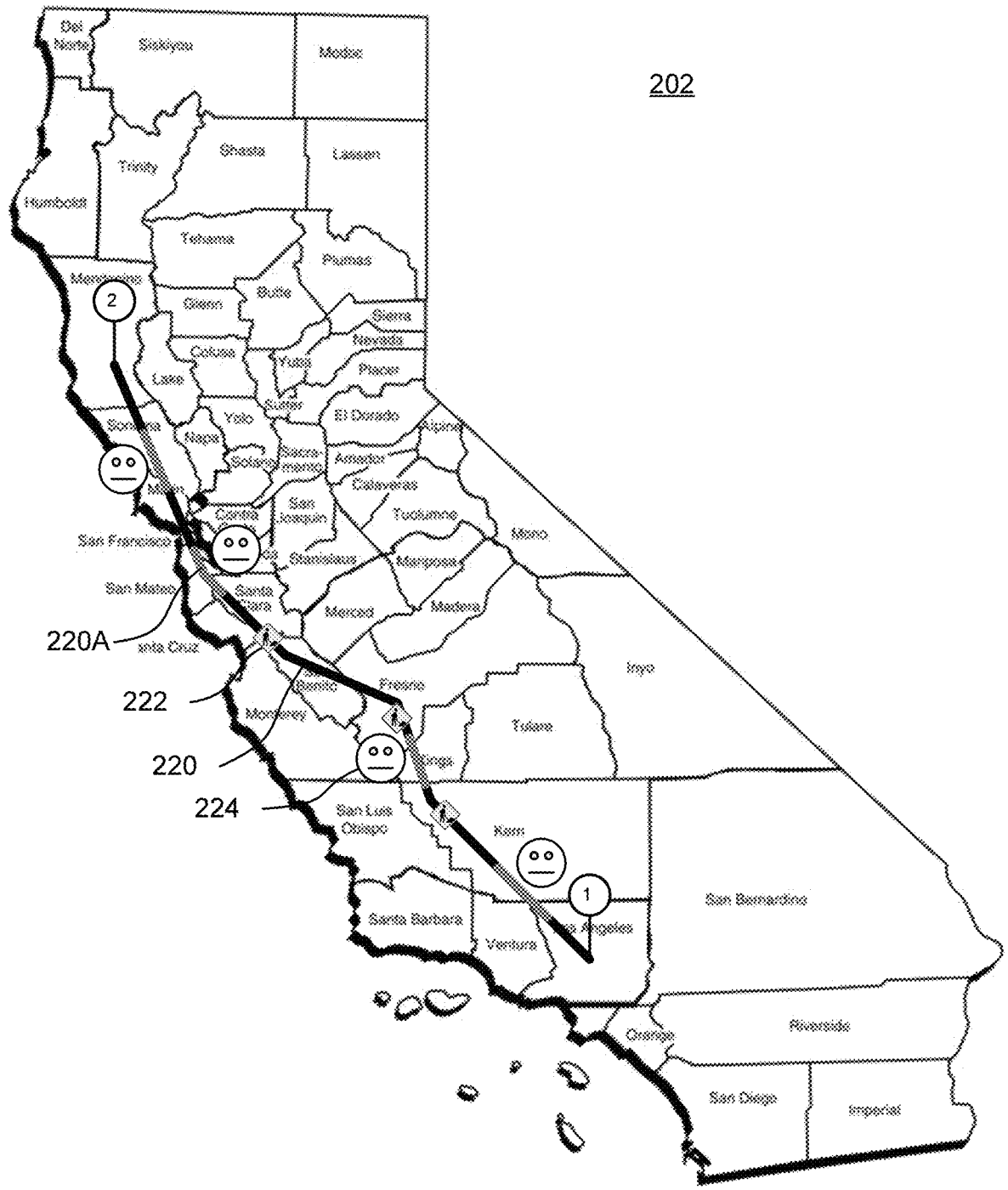
FIG. 2D illustrates an example map including current driver behavior information.

In another example embodiment, FIG. 2D shows HFMap 202. In one embodiment, the online map 206 may serve as a base layer of the HFMap 204, similar to the MFMap 204. As depicted, the map displays route 220 that begins in Los Angeles (drop pin 1) and ends in Mendocino (drop pin 2) with icons 222, areas or segments 220A, and one or more fatigued drivers 220B. Different from MFMap 204, the HFMap 202 shows historical driver behaviors, such as fatigued driver behavior, that have been collected over a predefined period. For example, the historical data for fatigued drivers may be collected by fatigue detector 106, and stored in database 118, from Sep. 1, 2018 to Sep. 30, 2018, or between 10:00 am and 5:00 pm on Oct. 17, 2018.

Turning back to FIG. 2A, prior to inputting the online map 206, MFMap 204 and HFMap 206 into the machine learning engine 109, models 109A are trained to understand how to classify and identify relevant information. For example, a model 109A may be trained to understand images or motion or sound of a driver that are identifiable with fatigued driving. Likewise, the same model may be trained using images or motion or sound that is not identifiable with fatigued driving in order to prevent or avoid various actions as being perceived as driver fatigue.

The machine learning engine 109 itself may come in many different forms, such as supervised or unsupervised learning techniques, as understood by the skilled artisan. Moreover, the machine learning engine 109 may perform calculation using other functions, such as linear computation, non-linear computation, deep learning methods, such as a convolutional neural network (CNN), recurrent neural network (RNN), multi-linear computation, and like. For purposes of discussion, the machine learning engine 109 is a deep learning engine that includes a convolutional neural network (CNN) 109B. In one embodiment, the CNN 109B is trained to generate a behavior model to understand driver behaviors. The CNN 109B includes multiple layers, each of which may be different types of layers. These different types of layers can include, for example, a convolution layer, a pooling layer, a normalization layer, and a fully connected layer. In one embodiment, the CNN 109B analyzes input data (in this case, the online map, MFMap and HFMap data, along with data collected by the fatigue detector 106) and is trained to perform a desired analysis, where the training is performed on a set of training data (e.g., a subset of the input data). The CNN 109B "learns" the analysis based on the set of training data and results obtained. For example, a set of training data may include a subset of collected current map data, historical map data, driver fatigue data (such as historical fatigue data and current fatigue data), etc. that has been collected and/or stored by respective components in system 100 (FIG. 1) or retrieved from other sources, such as a database of driver behavior data. The subset of collected current map data, historical map data and driver fatigue data may be analyzed in such a manner so that the CNN 109B trains the behavior model to understand specific driver behaviors, and in particular behaviors associated with driver fatigue, as identified by the input data during training.

Figure 2E:
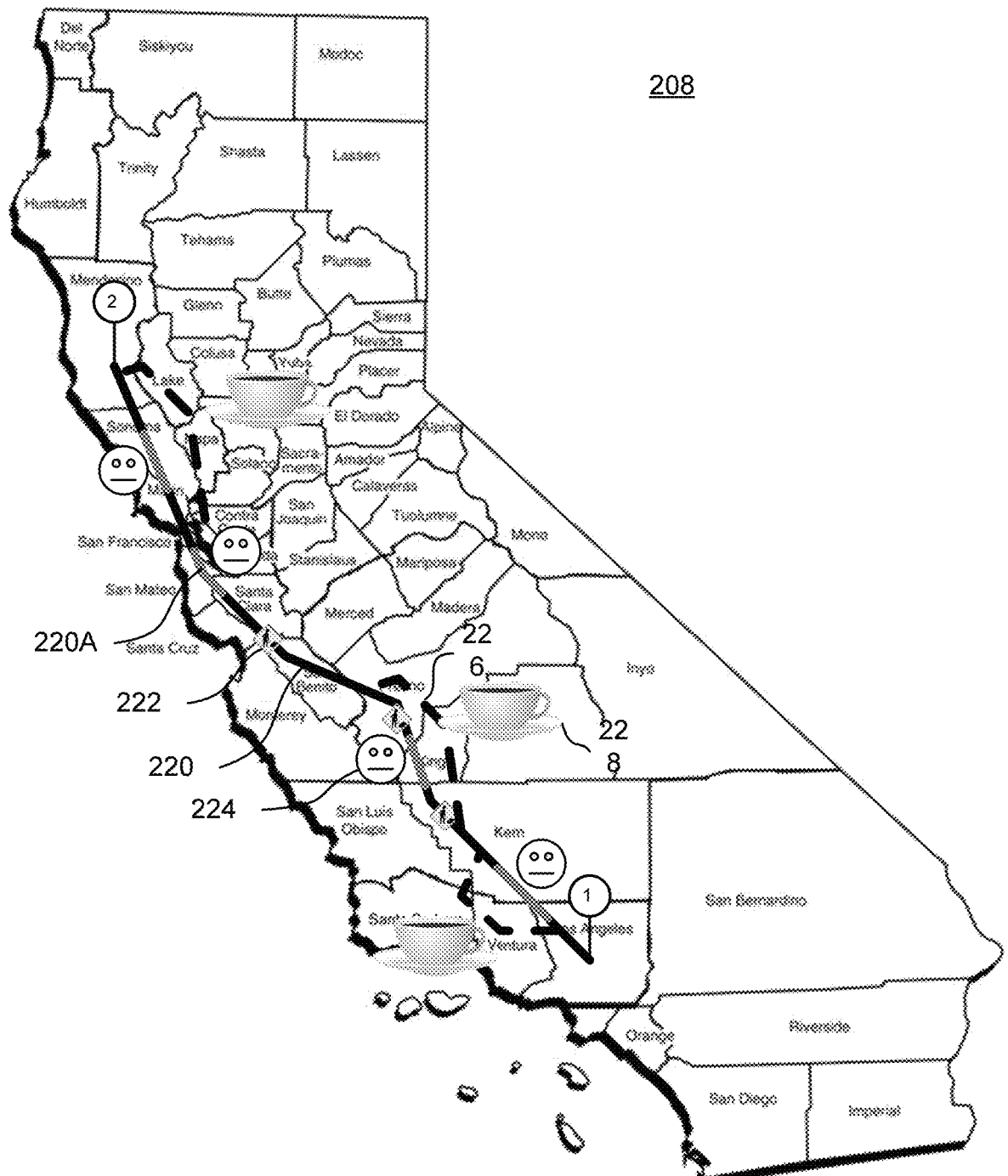
FIG. 2E illustrates an example map including personalized driver behavior information.

Once trained, the model 109A may use the collected data, such as collected map data (including historical data and current data), driver fatigue data, etc., as input to generate and output the personalized fatigue map (PFMap) 208, as illustrated in FIG. 2E.

The PFMap 208 is a personalized map of the driver 102 of vehicle 101. In addition to providing typical mapping and/or navigational information, the PFMap 208 provides recommendations or suggestions for alternative routes 226 (shown as dashed lines) to alter the route (i.e., re-route) in the event that driver fatigue is detected by the fatigue detector 106. In one embodiment, the recommendations or suggestions are provided when driver fatigue is detected in other vehicles surrounding or nearby (neighboring vehicles) the driver 102 of vehicle 102. The PFMap 208 may also include risk data, including distraction driving, or drunk driving, which can be indicated as part of the displayed map.

In one embodiment, the PFMap 208 is displayed on a display 114 in the vehicle 101 and includes one or more visual indications 228 of one or more locations on the map determined to be an effective rest stop for the driver 102. The alternative routes 226 and visual indications 228 of the locations may be displayed using additional layers to the online map 206. For example, a re-route layer may provide alternative routes 226 and a personalized layer may provide visual indications 228 of the locations a driver may be re-routed to in order to rest. In one embodiment, the alternative routes 226 may be provided to the driver 102 in advance of becoming fatigued. For example, route segments on the PFMap 208 may show areas known to cause driver fatigue. Prior to the vehicle 101 reaching this route segment, an alternative route 226 may be displayed on display 114 or the route 220 may be updated to replace the current route segment with the alternative route segment (the route is altered or re-routed).

In one example, the online map 206 may serve as a base layer of the PFMap 208, similar to the MFMap 204 and HFMap 206. In addition to route 220, icons 222, areas or segments 220A, and one or more fatigued drivers 220B, the PFMap 208 includes additional route segments (e.g., alternative routes 226) that re-route the driver to a resting point 228, such as a coffee shop. In one embodiment, the alternative routes 226 may be computed or selected based on driver fatigue of the driver 102 of vehicle 101 and/or based on a combination of driver fatigue and the information provided by the online map 202, the MFMap 204 and the HFMap 206. In one embodiment, the level of fatigue detected will determine the suggested or alternative route, as explained further below. In some embodiments, the level of detected driver fatigue may cause the vehicle 101 to be automatically re-routed. In one embodiment, the level of fatigue may be measured according to a fatigue score or fatigue scoring scale, as described below.

Figure 3A:
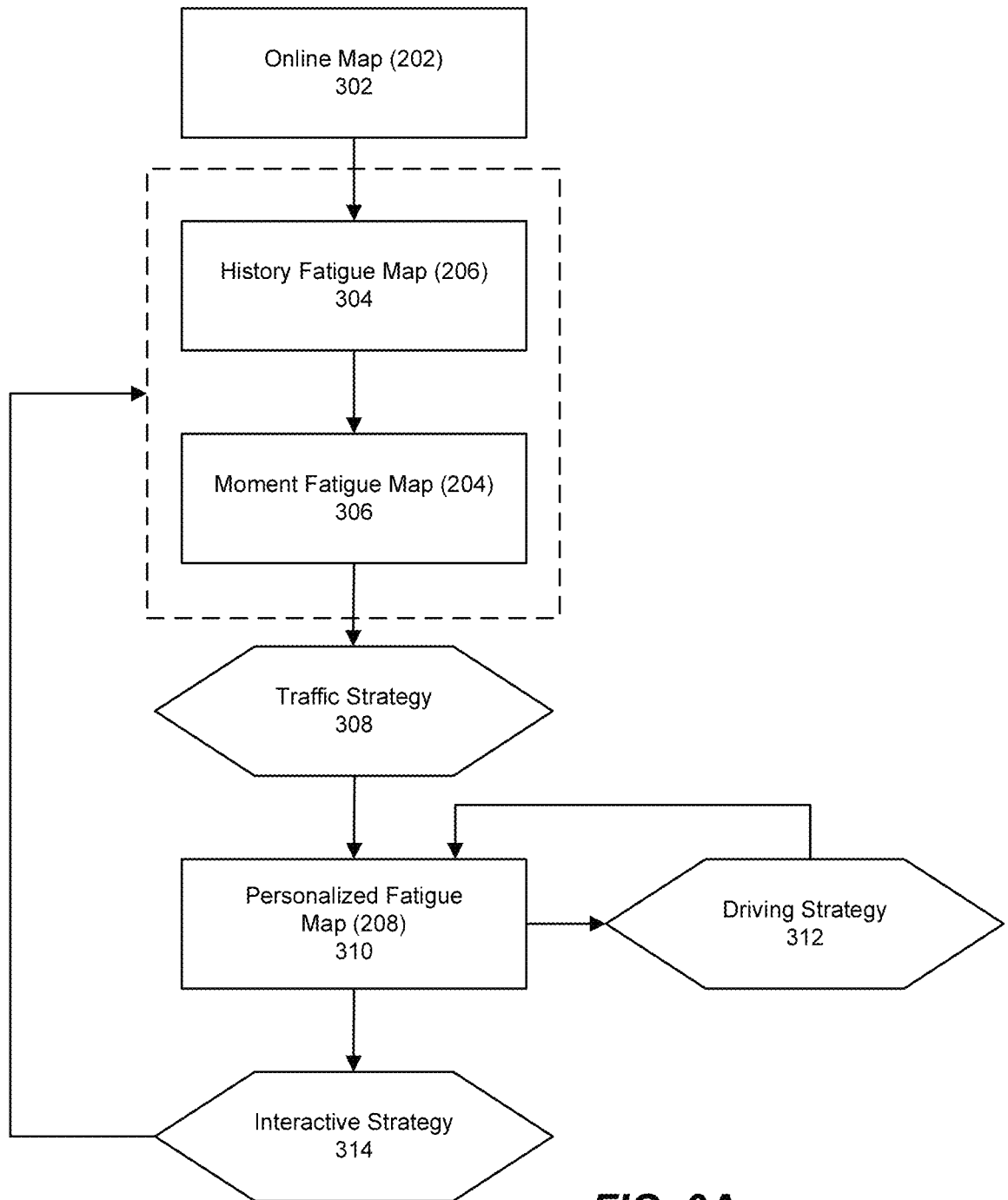
FIG. 3A illustrates an example flow diagram of generating and updating a personalized fatigue map.

FIG. 3A illustrates an example flow diagram of generating and updating a personalized fatigue map. In embodiments, the flow diagrams may be computer-implemented methods performed, at least partly, by hardware and/or software components illustrated in the various figures and as described herein. In one embodiment, the disclosed process may be performed by system 100, and in particular, by the fatigue detector 106 and navigation system 120, or the system disclosed in FIG. 6. In one embodiment, software components executed by one or more processors, such as processor(s) 109 or processor 602, perform at least a portion of the process.

The process begins at step 302 when the navigation system 120 loads an online map 202, and a route is selected by the driver 102 of vehicle 101. In one embodiment, route selection may include the driver 101 inputting a destination into the navigation system 120, as appreciated by the skilled artisan. Upon loading the online map 202, the system 100 may be initiated or activated for fatigue detection and analysis. Initiation or activation of the system 100 causes at least one of HFMap 206 and MFMap 204 to be loaded at steps 304 and 306, respectively. In one embodiment, if the HFMap 206 and/or MFMap 204 exist in the database 118, the maps may be loaded for use by the system 100. In another embodiment, if either or both of the HFMap 206 and MFMap 204 do not exist in the database 118, the maps may be created by the system 100.

Figure 3B:
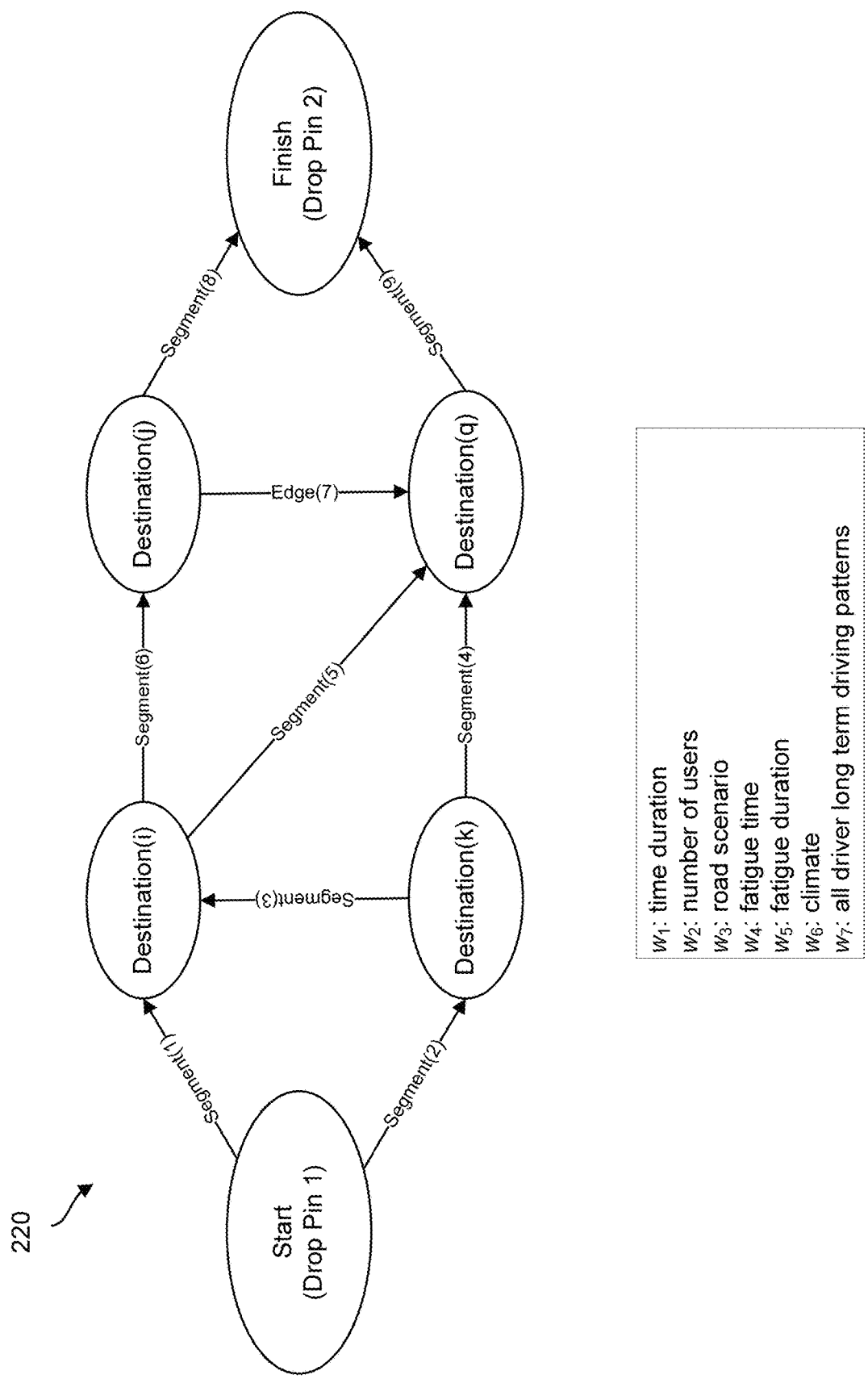
FIG. 3B illustrates an example route planning strategy in accordance with embodiments of the disclosure.

In one embodiment, and with reference to FIG. 3B, the HFMap 206 and MFMap 204 may be created using a route planning strategy. In the route planning strategy, driver behavior data is collected and measured along segments of a route to create the HFMap 206 and MFMap 204. In one embodiment, and for purposes of discussion, collected driver behavior data includes factors such as time duration (e.g., 1 year, 3 weeks, 2 hours), a number of users (e.g., 1 million), road scenarios (e.g., high-speed road, long road, straight road), fatigue time (different time of the day), fatigue duration (e.g., holiday or workday), climate (e.g., fog, snow, wind, rain) and long term driving patterns. Long term driving patterns may include factors such as driving late at night, early morning or midafternoon, length of period without a break or stop, taking medication, drugs or alcohol, or other sleeping obstacles or factors. These factors may be measured and calculated along one or more segments of a route and used to predict and determine driver fatigue levels (or fatigue scores) that may then be applied to the maps.

In the depicted embodiment of FIG. 3B, the route 220 includes nodes (drop pin 1 and drop pin 2) or destinations i, j, k, and q and route segments 1-9 formed between each of the nodes or destinations. The term node and destination may be used synonymously within the context of this disclosure, and includes the start node, the finish node and any intermediate nodes. Destinations i, j, k and q may be any point on a map that has been or may be designated as a starting, stopping or ending point on the route 220, and is not limited to a final destination, such as finish node (drop pin 2). As shown, each of the segments 1-9 is connected between a first node (drop pin 1 or drop pin 2) or destination i, j, k or q and a second node (drop pin 1 or drop pin 2) or destination i, j, k or q, and is indicative of a distance.

With continued reference to FIG. 3B, in order to determine a fatigue level (or fatigue score) for each segment 1-9, the factors are collected and measured along one or more segments 1-9 of the route 220. In one embodiment, factors may be represented as a parameter set for historical data. In another embodiment, the factors may be represented as a parameter set for current data. In still another embodiment, the factors may be represented as a parameter set for personalized data.

It is appreciated that the collection of historical, current and personalized data may be an iterative process in which the historical data, current data and personalized data are continuously being measured, fatigue levels calculated and maps updated. Continuously may mean non-stop (constant) or at set times or intervals or randomly. Moreover, the historical data, current data and personalized data may be collected and measured during the same time or interval or set to be collected and measured at different times or intervals. For example, historical data may be collected and measured on a weekly basis, whereas current data and personalized data may be collected and measured constantly and in real-time.

When collecting historical data for HFMap 206, the parameter set includes the following factors: $w_1$: time duration, $w_2$: number of users, $w_3$: road scenario, $w_4$: fatigue time, $w_5$: fatigue duration, $w_6$: climate, and $w_7$: all driver long term driving patterns. To determine the fatigue level for a segment in the HFMap 206, a fatigue score $s_1$ is calculated using the factors in the parameter set according to the following formula:

$$s_1 = \Sigma_{<i,j>}^{N} \|d_{ij}(w_1, \ldots, w_7) - \tilde{d}_{ij}\|_F \quad (1),$$

where i,j are start (drop pin 1) and finish (drop pin 2) points of a route segment 1-9, N is the number of segment, $d_{ij}(\bullet)$ is the Euclidean length of $<i,j>$, $\tilde{d}$ is the optimal distance, and $\|\bullet\|_F$ is F-norm.

In the case of MFMap 204, the parameter set includes factors for current data. Factors collected for the current data are the same as the factors collected for the historical data, with the exception of the time duration ($w_1$). Thus, the parameter set used to calculate the fatigue level $s_2$ for a segment in the MFMap 204 includes the factors: $w_2$: number of users, $w_3$: road scenario, $w_4$: fatigue time, $w_5$: fatigue duration, $w_6$: climate, and $w_7$: all driver long term driving patterns. To determine the fatigue level for a segment in the MFMap 204, a fatigue score $s_2$ is calculated using the factors in the parameter set according to the following formula:

$$s_2 = \Sigma_{<i,j>}^{N} \|d_{ij}(w_2, \ldots, w_7) - \tilde{d}_{ij}\|_F \quad (2)$$

where i,j are start (drop pin 1) and finish (drop pin 2) points of a route segment 1-9, N is the number of segment, $d_{ij}(\bullet)$ is the Euclidean length of $<i,j>$, $\tilde{d}$ is the optimal distance, and $\|\bullet\|_F$ is F-norm.

In one embodiment, when no PFMap 208 has been created, the HFMap 204 and MFMap 206 (and online map 202) may be used to create an initial PFMap 208 for the driver 102 of vehicle 101 using the afore-mentioned machine learning engine 109 (FIG. 1). In one other embodiment, the initial PFMap 208 may be retrieved from database 118 or some other external data source.

In another embodiment, when the PFMap 208 has already been created, the fatigue level (or score) for each segment 1-9 in route 220 may be calculated. Factors collected for the personalized data are the same as the factors collected for the current data, with the exception of the number of user ($w_2$). Thus, the parameter set used to calculate the fatigue level $s_3$ for a segment in the PFMap 208 includes the factors: $w_3$: road scenario, $w_4$: fatigue time, $w_5$: fatigue duration, $w_6$: climate, and $w_7$: all driver long term driving patterns. To determine the fatigue level for a segment in the PFMap 208, a fatigue score $s_3$ is calculated using the factors in the parameter set according to the following formula:

$$s_3 = \Sigma_{<i,j>}^{N} \|d_{ij}(w_3, \ldots, w_7) - \tilde{d}_{ij}\|_F \quad (3)$$

where i,j are start (drop pin 1) and finish (drop pin 2) points of a route segment 1-9, N is the number of segment, $d_{ij}(\bullet)$ is the Euclidean length of $<i,j>$, $\tilde{d}$ is the optimal distance, and $\|\bullet\|_F$ is F-norm.

Returning to FIG. 3A, at least one of three strategies may be employed to update the maps—a traffic strategy, a driving strategy and an interactive strategy. At step 308, the traffic strategy is implemented to update the PFMap 208 as the vehicle 101 progresses along route 220. When the fatigue detector 106 detects the driver 102 of vehicle 101 is fatigued, the system 100 will calculate the distances to a location (e.g., a rest stop or coffee shop) and update the PFMap 208 at step 310 using the following objective function:

$$\min_{w_1,\ldots,w_7} (\alpha s_0 + \beta s_1 + \gamma s_2 + \delta s_3), \quad (4)$$

where $\alpha, \beta, \gamma, \delta$ are weights of $s_0, s_1, s_2, s_3$, respectively, and $s_0$ is the optimal Euclidean distance from online map 202, which reflects traffic information in real-time from the online map 202. The weights may be assigned to each fatigue score $s_0, s_1, s_2, s_3$ in order to provide a lesser or greater influence of the specific fatigue level. For example, if the fatigue score $s_1$ should influence the objective function (4) more than the online map fatigue score $s_0$, it will be assigned a greater weight (e.g., $\alpha$ will be less than $\beta$).

In one embodiment, the calculated fatigue scores may be stored in database 118 for use in determining the historical fatigue data (historical data that includes historical fatigue).

Once the driver 102 of vehicle 101 is on route 220, a driving strategy may be implemented to update the PFMap 310 at step 312. In one embodiment, the driving strategy may be implemented in combination with the traffic strategy. When fatigue detector 106 detects that driver 102 is fatigued, the navigation system 120 will issue a warning 210 (FIG. 2) and/or provide an alternative route 226 (FIG. 6) in which to re-route the vehicle 101 to a location determined to be an effective stop for resting.

In one embodiment, the level of driver fatigue determines how the system 100 responds to the detected driver fatigue. For example, a driver 102 with a lower level of fatigue may only be issued a warning 210 (visual and/or audible) by navigation system 120, whereas a driver 102 with a higher level of fatigue may be issued a warning 210 and re-routed to an alternative route 226 by navigation system 120.

In the case of PFMap 208, the level of driver fatigue may be determined or measured for each segment along a route 220 using factors $w_3$-$w_7$ and equation (3), as explained above. In one embodiment, processor(s) 108 may include a computer executable algorithm for determining a level of driver fatigue based on factors $w_3$-$w_7$ and equation (3) and output a fatigue score $s_3$. The output fatigue score $s_3$ may be indicative of whether the driver 102 is too fatigued or tired to drive, or some other indicator relating to a present fatigue level of the driver 102. For example, the level of driver fatigue may be based on a rating or scoring scale of 0-3, where '0' is an "awake" state and the lowest level of fatigue, '1' is a "slightly tired" state, '2' is a 'heavy sleep' state, and '3' is a 'fully asleep' state and the highest level of fatigue. Other fatigue scoring scales and rating systems may also be employed.

In one example, and for purposes of discussion, the navigation system 120 provides a warning 210 and displays an alternative route 226. In one embodiment, with reference to FIG. 4B and upon detection of driver fatigue, an algorithm or instructions executed by processor(s) 108 may be configured as follows:

If current driver's fatigue level≥3, then
If existing automatic driving pattern, then
Changing to automatic driving pattern
Else [driver's fatigue level<3 or no existing automatic driving pattern]
Updating personalized fatigue map
Changing route to local place, keep warning to have a rest or coffee
Updating the driving route
Updating MFMap and HFMap where the level of driver fatigue is measured according to the fatigue scores {0, 1, 2, 3} and respectively correspond to {awake, slightly sleepy, heavy sleep, fully asleep}. It is appreciated that the fatigue level may be adjusted in the algorithm/instructions.

According to the algorithm or instructions, when the current driver's fatigue level has a fatigue score $s_3$ calculated to be greater than or equal to 3, and if the vehicle 101 is capable of autonomous driving, the vehicle 101 is placed into self-driving mode and proceeds to the designated resting stop via alternative route 226. A warning 210 and visual indicator may also be provided by the vehicle 101.

Figure 4A:
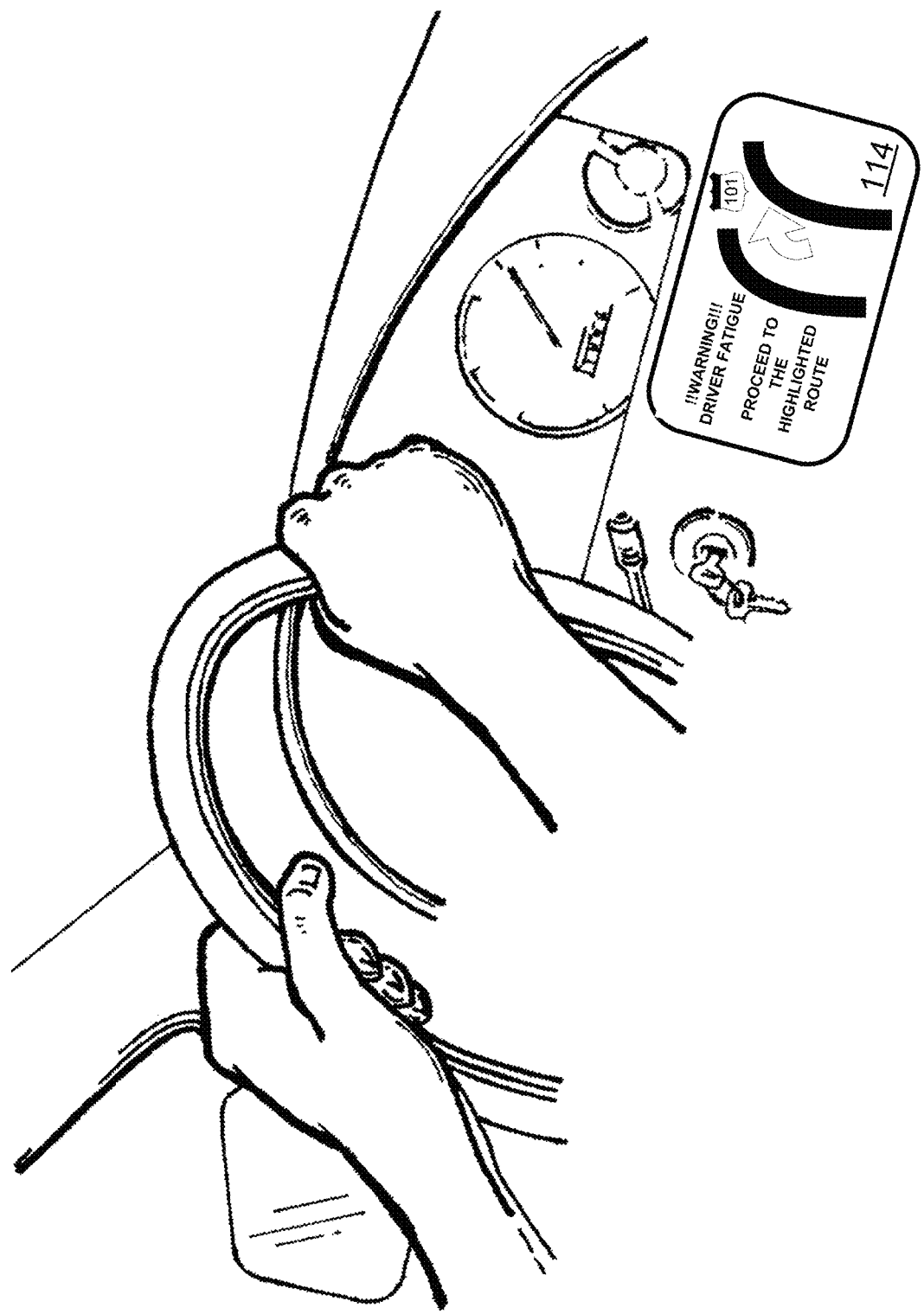
FIG. 4A illustrates a cab of a vehicle with a navigation system displaying fatigue detection information.

If the current driver's fatigue level has a fatigue score $s_3$ that is calculated to be less than 2 (or the fatigue score is greater than or equal to 3 and the vehicle does not have an autonomous driving mode), the vehicle 101 may perform one or more of updating the PFMap 208, changing the route to an alternative route and warning the driver to take a rest, and update the driving route. For example, and with reference to FIG. 4A, a higher fatigue score, such as fatigue score $s_3$ equal to 3, may prompt the system 100 to display "!!WARNING!! DRIVER FATIGUE" "PROCEED TO THE HIGHLIGHTED ROUTE" and turn-by-turn instructions to the nearest location (e.g., nearest rest stop) on display 114. A lower fatigue score, such as fatigue score $s_3$ equal to 1, may prompt the system 100 to provide only an audible warning to the driver 102, such as "Stay awake!"

Figure 4B:
FIGS. 4B and 5 illustrate a driver's view from within a vehicle when driver fatigue is detected according to a personalized fatigue map.

In another example, and with reference to FIG. 4B, the navigation system 120 provides a warning 210 and recommends an alternative route 226. Similar to the first example, upon detection of driver fatigue, an algorithm or instructions executed by processor(s) 108 may be configured as follows:

If fatigue level>0 and <3, then
Updating personalized fatigue map
Recommend changing route to a local rest stop
Adding an audible warning
Updating MFMap and HFMap
If fatigue level≥3
Changing to automatic driving pattern
Else
Updating personalized fatigue map where the level of driver fatigue is measured according to the fatigue scores {0, 1, 2, 3} and respectively correspond to {awake, slightly sleepy, heavy sleep, fully asleep}. It is appreciated that the fatigue level may be adjusted in the algorithm/instructions.

According to the algorithm or instructions, when the current driver's fatigue level has a fatigue score $s_3$ calculated to be greater than 0 or less than 3, the system 100 updates the PFMap 208 to recommend changing the route to an alternative route. For example, and with reference to a driver's view shown in FIG. 4B, PFMap 208 will be updated to include an alternative route 226. The alternative route 226 may be displayed to the driver 102 as a recommendation to proceed to a local rest stop as opposed to continuing along the route 220. In one embodiment, the system 100 also provides an audible warning (e.g., "Caution, proceed to the nearest coffee shop to have a rest") and/or updates the MFMap 204 and HFMap 202 (per the interactive strategy discussed below).

If the current driver's fatigue level has a fatigue score $s_3$ that is calculated to be greater than 3, the vehicle 101 is placed into self-driving mode and proceeds to the designated resting stop via alternative route 226. A warning 210 and visual indicator may also be provided by the vehicle 101. Otherwise, the vehicle 101 updates the PFMap 208 in accordance with the driving strategy, as discussed above.

Turning back to FIG. 3A, an interactive strategy may be implemented at step 314. In one embodiment, the interactive strategy uses all driver behavior data as collected by system 100 in each driver's vehicle and/or all driver behavior data that is subjectively reported by the driver of a respective vehicle. The driver behavior data (including data subjectively reported) may be collected, measured and stored as discussed above to create historical fatigue maps, moment fatigue maps and personalized fatigue maps for each of the drivers. The subjectively reported driver behavior may include comments or data that is reported by the driver, but that is not otherwise detectable by the system 100. For example, the system 100 may not be able to detect the amount of sleep a driver had before beginning to drive along a route, unless it is reported by the driver. Similarly, the system 100 may not be able to detect the intoxication level of a driver, unless it is reported by the driver. In one embodiment, subjectively reported driver behavior may be included as part of the driver profile stored as profile 107.

In one example, and for purposes of discussion, the navigation system 120 provides a warning 210 and/or displays an alternative route 226 upon detection of driver fatigue in one or more nearby or neighboring vehicles. A nearby or neighboring vehicle may include, but is not limited to, vehicles within the vicinity of a driver (e.g., a vehicle within a predefined distance), such as a vehicle in an adjacent lane, a vehicle following or trailing in the same lane, or a vehicle in the current route segment, and which may pose a safety risk to the current driver due to driver behaviors, such as detected fatigue. In one embodiment, an algorithm or instructions executed by processor(s) 108 may be configured as follows to implement the interactive strategy:

If neighbor driver fatigue level>1, then
Update MFMap using parameter set and eq (1), and
Update HFMap using parameter set and eq (3).
where the level of driver fatigue is measured according to the fatigue scores {0, 1, 2, 3} and respectively correspond to {awake, slightly sleepy, heavy sleep, fully asleep}. It is appreciated that the fatigue level may be adjusted in the algorithm/instructions.

Accordingly, the algorithm or instructions, when one or more neighboring driver's fatigue level has a fatigue score $s_3$ calculated to be greater than 1, the system 100 updates the MFMap 206 and HFMap 204 using a respective parameter set and objective function (e.g., equation 1 or 3).

In one embodiment, after updating the HFMap 206 and the MFMap 204, the PFMap 208 will be updated and a recommendation to change lanes or routes will be issued, which may include a visual and/or audible warning. In one embodiment, an algorithm or instructions executed by processor(s) 108 may be configured as follows to implement the interactive strategy:

If neighbors' fatigue level>1, then
Updating MFMap and HFMap.
Updating PFMap.
Recommending a lane or route change to avoid the fatigue area
Audible warning
Else Updating PFMap
where the level of driver fatigue is measured according to the fatigue scores {0, 1, 2, 3} and respectively correspond to {awake, slightly sleepy, heavy sleep, fully asleep}. It is appreciated that the fatigue level may be adjusted in the algorithm/instructions.

Figure 5:

For example, and with reference to a driver's view shown in FIG. 5, when one or more neighboring drivers 502 have a fatigue level greater than 1, the MFMap 206 and the HFMap 204 are updated, followed by an update to the PFMap 208 to include an alternative route 226. The alternative route 226 may be displayed to the driver 102 as a recommendation to proceed to another lane along the route 220 so as to avoid the one or more neighboring fatigued drivers 502. In one embodiment, the system 100 also provides an audible warning (e.g., "Caution, there are 6 fatigue drivers in this area").

If the one or more neighboring driver's fatigue level has a fatigue score $s_3$ that is calculated to be less than 1, the vehicle 101 updates the PFMap 208 in accordance with the traffic strategy, driving strategy and/or interactive strategy, as discussed above.

Figure 6:
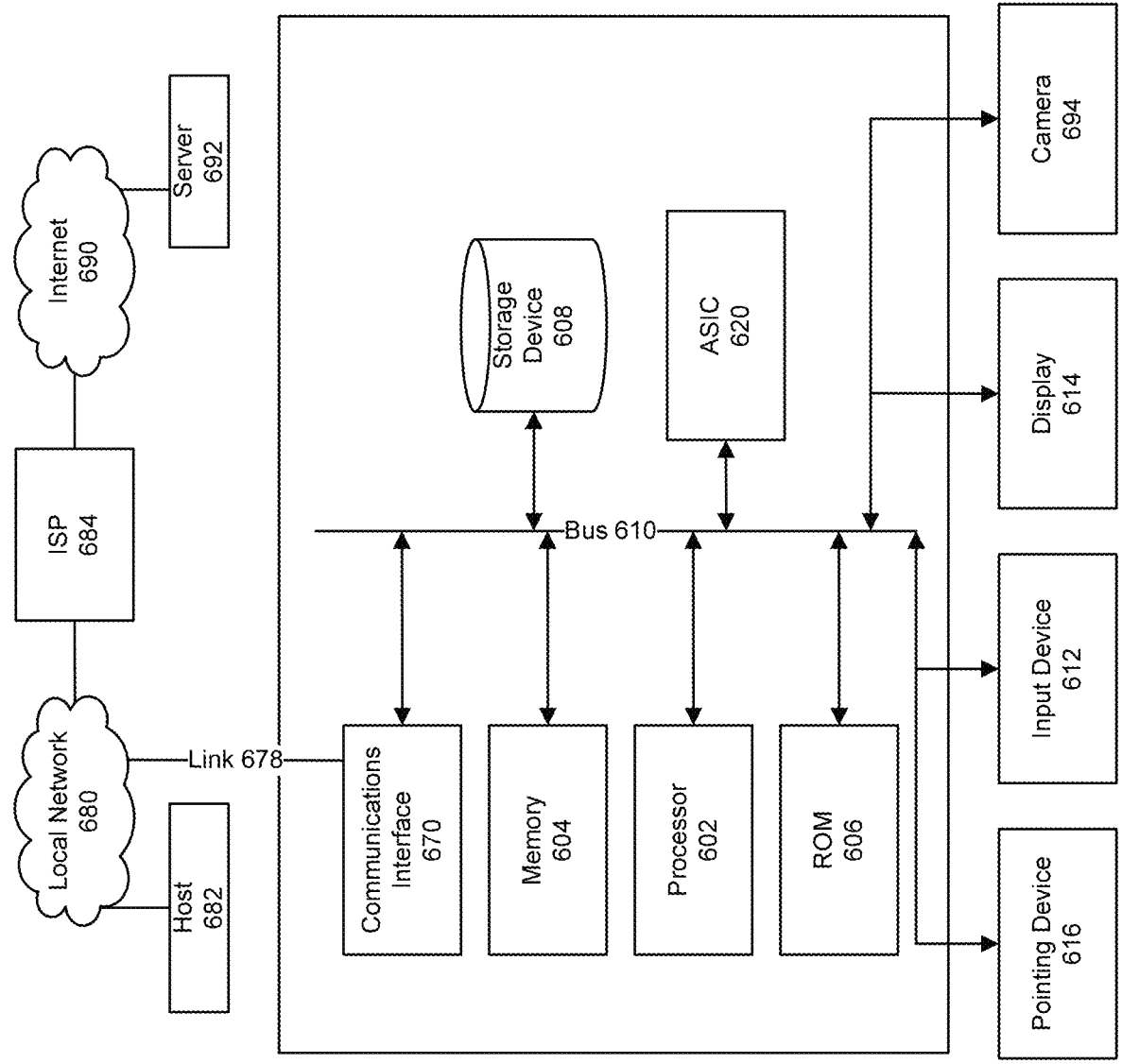
FIG. 6 illustrates a computing system upon embodiments of the disclosure may be implemented.

FIG. 6 illustrates a computing system upon embodiments of the disclosure may be implemented. Computing system 600 may be programmed (e.g., via computer program code or instructions) to provide enhanced safety to drivers using driver behavior detection as described herein and includes a communication mechanism such as a bus 610 for passing information between other internal and external components of the computer system 600. In one embodiment, the computer system 600 is system 100 of FIG. 1. Computer system 600, or a portion thereof, constitutes a means for performing one or more steps for providing enhanced safety to drivers using the driver behavior detection.

A bus 610 includes one or more parallel conductors of information so that information is transferred quickly among devices coupled to the bus 610. One or more processors 602 for processing information are coupled with the bus 610.

One or more processors 602 performs a set of operations on information (or data) as specified by computer program code related to for provide enhanced safety to drivers using driver behavior detection. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions.

Computer system 600 also includes a memory 604 coupled to bus 610. The memory 604, such as a random access memory (RAM) or any other dynamic storage device, stores information including processor instructions for providing enhanced safety to drivers using driver behavior detection. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information. Also coupled to bus 610 is a non-volatile (persistent) storage device 608, such as a magnetic disk, optical disk or flash card, for storing information, including instructions.

In one embodiment, information, including instructions for providing enhanced safety to drivers using driver behavior detection, is provided to the bus 610 for use by the processor from an external input device 612, such as a keyboard operated by a human user, a microphone, an Infrared (IR) remote control, a joystick, a game pad, a stylus pen, a touch screen, head mounted display or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614 for presenting text or images, and a pointing device 616, such as a mouse, a trackball, cursor direction keys, or a motion sensor, for controlling a position of a small cursor image presented on the display 614 and issuing commands associated with graphical elements presented on the display 614, and one or more camera sensors 694 for capturing, recording and causing to store one or more still and/or moving images (e.g., videos, movies, etc.) which also may comprise audio recordings.

In the illustrated embodiment, special purpose hardware, such as an application specific integrated circuit (ASIC) 620, is coupled to bus 610. The special purpose hardware is configured to perform operations not performed by processor 602 quickly enough for special purposes.

Computer system 600 also includes a communications interface 670 coupled to bus 610. Communication interface 670 provides a one-way or two-way communication coupling to a variety of external devices that operate with their own processors. In general the coupling is with a network link 678 that is connected to a local network 680 to which a variety of external devices, such as a server or database, may be connected. Alternatively, link 678 may connect directly to an Internet service provider (ISP) 684 or to network 690, such as the Internet. The network link 678 may be wired or wireless. For example, communication interface 670 may be a parallel port or a serial port or a universal serial bus (USB) port on a personal computer. In some embodiments, communication interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends and/or receives electrical, acoustic or electromagnetic signals, including infrared and optical signals, which carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to a communication network for providing enhanced safety to drivers using driver behavior detection to mobile devices, such as mobile phones or tablets.

Network link 678 typically provides information using transmission media through one or more networks to other devices that use or process the information. For example, network link 678 may provide a connection through local network 680 to a host computer 682 or to equipment 684 operated by an ISP. ISP equipment 684 in turn provide data communication services through the public, world-wide packet-switching communication network of networks now commonly referred to as the Internet 690.

A computer called a server host 682 connected to the Internet hosts a process that provides a service in response to information received over the Internet. For example, server host 682 hosts a process that provides information representing video data for presentation at display 614. It is contemplated that the components of system 600 can be deployed in various configurations within other computer systems, e.g., host 682 and server 692.

At least some embodiments of the disclosure are related to the use of computer system 600 for implementing some or all of the techniques described herein. According to one embodiment of the disclosure, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
    accessing one or more data sources storing map data including historical fatigue data and current fatigue data for one or more segments of a route for drivers of one or more neighboring vehicles;
    generating a personalized fatigue map for a driver of a current vehicle based on the map data obtained by accessing the one or more data sources, where the personalized fatigue map displays predicted driver fatigue of the driver of the current vehicle for the one or more segments on the route;
    monitoring the drivers of the one or more neighboring vehicles and the current vehicle to detect driver fatigue based on readings captured by one or more sensors, where a level of the driver fatigue is measured according to a fatigue score;
    outputting a recommendation, upon detection of the driver fatigue, to the driver of the current vehicle that is based on the level of the driver fatigue and updating the personalized fatigue map to reflect the recommendation;
    updating a historical fatigue map and a current fatigue map to reflect a level of fatigue of the drivers in the one or more neighboring vehicles; and
    updating the personalized fatigue map to alter the route of the current vehicle to avoid the drivers in the one or more neighboring vehicles determined to pose a safety risk.

2. The computer-implemented method of claim 1, wherein the map data further includes online map data acquired from an online mapping data source;
    wherein the historical fatigue data is collected for the drivers of the one or more neighboring vehicles during a specified period in the past, and the historical fatigue data is used to generate the historical fatigue map that indicates the driver fatigue in each of the one or more neighboring vehicles along the one or more segments of the route; and
    wherein the current fatigue data is collected for the drivers of the one or more neighboring first vehicles in real-time, and the current fatigue data is used to generate the current fatigue map that indicates the driver fatigue in each of the one or more neighboring vehicles along the one or more segments of the route.

3. The computer-implemented method of claim 2, wherein generating the personalized fatigue map comprises applying the online map data, the historical fatigue map and the current fatigue map to a learning algorithm to generate the personalized fatigue map.

4. The computer-implemented method of claim 2, further comprising:
    calculating the fatigue score for the drivers in the one or more neighboring vehicles based on a set of parameters and an objective function; and
    when the drivers in the one or more neighboring vehicles are each a neighboring driver of the driver in the current vehicle and pose a safety risk to the driver of the current vehicle based on the detected driver fatigue of the drivers of the one or more neighboring vehicles, alerting the driver of the current vehicle to avoid the neighboring driver determined to pose a safety risk as the recommendation.

5. The computer-implemented method of claim 4, further comprising:
    calculating the fatigue score for the driver in the current vehicle based on a set of parameters and an objective function when the driver in the current vehicle is detected to have the driver fatigue; and
    alerting the driver of the current vehicle based on the historical fatigue data and the current fatigue data for the drivers of the one or more neighboring vehicles and the calculated fatigue score of the driver of the current vehicle.

6. The computer-implemented method of claim 5, further comprising:
updating the personalized fatigue map to alter the route of the current vehicle based on the calculated fatigue score for the driver of the current vehicle; and
updating the historical fatigue map and the current fatigue map to reflect the level of fatigue of the drivers in the one or more neighboring vehicles.

7. The computer-implemented method of claim 4, wherein the set of parameters includes one or more of a time duration, number of users, road scenario, fatigue time, fatigue duration, climate and driver long term driving patterns.

8. The computer-implemented method of claim 4, wherein the altering comprises:
providing a warning to the driver of the current vehicle when the level of fatigue is calculated to be a first level;
providing a warning and an alternative route to the driver of the current vehicle to a nearby location for rest when the level of fatigue is calculated to be a second level; and
providing a warning to the driver of the current vehicle and enter the current vehicle into autonomous driving mode when the level of fatigue is calculated to be a third level.

9. A device, comprising:
a non-transitory memory storage comprising instructions; and
one or more processors in communication with the memory, wherein the one or more processors execute the instructions to:
access one or more data sources storing map data including historical fatigue data and current fatigue data for one or more segments of a route for drivers of one or more neighboring vehicles;
generate a personalized fatigue map for a driver of a current vehicle based on the map data obtained by accessing the one or more data sources, where the personalized fatigue map displays predicted driver fatigue of the driver of the current vehicle for the one or more segments on the route;
monitor the drivers of the one or more neighboring vehicles and the current vehicle to detect driver fatigue based on readings captured by one or more sensors, where a level of the driver fatigue is measured according to a fatigue score;
output a recommendation, upon detection of the driver fatigue, to the driver of the current vehicle that is based on the level of the driver fatigue and update the personalized fatigue map to reflect the recommendation;
update a historical fatigue map and a current fatigue map to reflect a level of fatigue of the drivers in the one or more neighboring vehicles; and
update the personalized fatigue map to alter the route of the current vehicle to avoid the drivers in the one or more neighboring vehicles determined to pose a safety risk.

10. The device of claim 9, wherein the map data further includes online map data acquired from an online mapping data source;
wherein the historical fatigue data is collected for the drivers of the one or more neighboring vehicles during a specified period in the past, and the historical fatigue data is used to generate the historical fatigue map that indicates the driver fatigue in each of the one or more neighboring vehicles along the one or more segments of the route; and
wherein the current fatigue data is collected for the drivers of the one or more neighboring first vehicles in real-time, and the current fatigue data is used to generate the current fatigue map that indicates the driver fatigue in each of the one or more neighboring vehicles along the one or more segments of the route.

11. The device of claim 10, wherein generating the personalized fatigue map comprises applying the online map data, the historical fatigue map and the current fatigue map to a learning algorithm to generate the personalized fatigue map.

12. The device of claim 10, the one or more processors further execute the instructions to:
calculate the fatigue score for the driver in the one or more neighboring vehicles based on a set of parameters and an objective function; and
when the driver in the one or more neighboring vehicles is a neighboring driver of the driver in the current vehicle and poses a safety risk to the driver of the current vehicle based on the detected driver fatigue of the driver of the one or more neighboring vehicles, alert the driver of the current vehicle to avoid the neighboring driver determined to pose a safety risk as the recommendation.

13. The device of claim 12, wherein the one or more processors further execute the instructions to:
calculate the fatigue score for the driver in the current vehicle based on a set of parameters and an objective function when the driver in the current vehicle is detected to have the driver fatigue; and
alert the driver of the current vehicle based on the historical fatigue data and the current fatigue data for the drivers of the one or more neighboring vehicles and the calculated fatigue score of the driver of the current vehicle.

14. The device of claim 13, wherein the one or more processors further execute the instructions to:
update the personalized fatigue map to alter the route of the current vehicle based on the calculated fatigue score for the driver of the current vehicle; and
update the historical fatigue map and the current fatigue map to reflect the level of fatigue of the drivers in the one or more neighboring vehicles.

15. The device of claim 12, wherein the set of parameters includes one or more of a time duration, number of users, road scenario, fatigue time, fatigue duration, climate and driver long term driving patterns.

16. The device of claim 12, wherein the altering comprises:
provide a warning to the driver of the current vehicle when the level of fatigue is calculated to be a first level;
provide a warning and an alternative route to the driver of the current vehicle to a nearby location for rest when the level of fatigue is calculated to be a second level; and
provide a warning to the driver of the current vehicle and enter the current vehicle into autonomous driving mode when the level of fatigue is calculated to be a third level.

17. A non-transitory computer-readable medium storing computer instructions, that when executed by one or more processors, cause the one or more processors to perform the steps of:

accessing one or more data sources storing map data including historical fatigue data and current fatigue data for one or more segments of a route for drivers of one or more neighboring vehicles;

generating a personalized fatigue map for a driver of a current vehicle based on the map data obtained by accessing the one or more data sources, where the personalized fatigue map displays predicted driver fatigue of the driver of the current vehicle for the one or more segments on the route;

monitoring the drivers of the one or more neighboring vehicles and the current vehicle to detect driver fatigue based on readings captured by one or more sensors, where a level of the driver fatigue is measured according to a fatigue score;

outputting a recommendation, upon detection of the driver fatigue, to the driver of the current vehicle that is based on the level of the driver fatigue and updating the personalized fatigue map to reflect the recommendation;

updating a historical fatigue map and a current fatigue map to reflect a level of fatigue of the drivers in the one or more neighboring vehicles; and updating the personalized fatigue map to alter the route of the current vehicle to avoid the drivers in the one or more neighboring vehicles determined to pose a safety risk.

18. The non-transitory computer-readable medium of claim 17, wherein the map data further includes online map data acquired from an online mapping data source;
wherein the historical fatigue data is collected for the drivers of the one or more neighboring vehicles during a specified period in the past, and the historical fatigue data is used to generate the historical fatigue map that indicates the driver fatigue in each of the one or more neighboring vehicles along the one or more segments of the route; and
wherein the current fatigue data is collected for the drivers of the one or more neighboring vehicles in real-time, and the current fatigue data is used to generate the current fatigue map that indicates the driver fatigue in each of the one or more neighboring vehicles along the one or more segments of the route.

19. The non-transitory computer-readable medium of claim 18, wherein generating the personalized fatigue map comprises applying the online map data, the historical fatigue map and the current fatigue map to a learning algorithm to generate the personalized fatigue map.

20. The non-transitory computer-readable medium of claim 19, further causing the one or more processors to perform the steps of:

calculating the fatigue score for the drivers in the one or more neighboring vehicles based on a set of parameters and an objective function; and when the drivers in the one or more neighboring vehicles is a neighboring driver of the driver in the current vehicle and poses a safety risk to the driver of the current vehicle based on the detected driver fatigue of the drivers of the one or more neighboring vehicles, alerting the driver of the current vehicle to avoid the neighboring driver determined to pose a safety risk as the recommendation.

21. The non-transitory computer-readable medium of claim 20, cause the one or more processors to perform the steps of:

calculating the fatigue score for the driver in the current vehicle based on a set of parameters and an objective function when the driver in the current vehicle is detected to have the driver fatigue; and alerting the driver of the current vehicle based on the historical fatigue data and the current fatigue data for the drivers of the one or more neighboring vehicles and the calculated fatigue score of the driver of the current vehicle.

22. The non-transitory computer-readable medium of claim 21, further comprising:

updating the personalized fatigue map to alter the route of the current vehicle based on the calculated fatigue score for the driver of the current vehicle; and updating the historical fatigue map and the current fatigue map to reflect the level of fatigue of the drivers in the one or more neighboring vehicles.

23. The non-transitory computer-readable medium of claim 20, wherein the set of parameters includes one or more of a time duration, number of users, road scenario, fatigue time, fatigue duration, climate and driver long term driving patterns.

24. The non-transitory computer-readable medium of claim 20, wherein the altering comprises:

providing a warning to the driver of the current vehicle when the level of fatigue is calculated to be a first level;

providing a warning and an alternative route to the driver of the current vehicle to a nearby location for rest when the level of fatigue is calculated to be a second level; and providing a warning to the driver of the current vehicle and enter the current vehicle into autonomous driving mode when the level of fatigue is calculated to be a third level.

* * * * *

UNITED STATES PATENT AND TRADEMARK OFFICE
CERTIFICATE OF CORRECTION

PATENT NO. : 11,906,318 B2
APPLICATION NO. : 17/486335
DATED : February 20, 2024
INVENTOR(S) : Chengcheng Jia et al.

It is certified that error appears in the above-identified patent and that said Letters Patent is hereby corrected as shown below:

In the Claims

Column 23, Claim 10, Lines 62-67, through Column 24, Lines 1-10, should read:
10. The device of claim 9, wherein the map data further includes online map data acquired from an online mapping data source;
    wherein the historical fatigue data is collected for the drivers of the one or more neighboring vehicles during a specified period in the past, and the historical fatigue data is used to generate the historical fatigue map that indicates the driver fatigue in each of the one or more neighboring vehicles along the one or more segments of the route; and
    wherein the current fatigue data is collected for the drivers of the one or more neighboring vehicles in real-time, and the current fatigue data is used to generate the current fatigue map that indicates the driver fatigue in each of the one or more neighboring vehicles along the one or more segments of the route.

Signed and Sealed this
Fourth Day of June, 2024

Katherine Kelly Vidal
*Director of the United States Patent and Trademark Office*